(12) United States Patent
Koren et al.

(10) Patent No.: US 7,267,777 B2
(45) Date of Patent: Sep. 11, 2007

(54) METHOD FOR THE REMOVAL OF CONTAMINANT METAL IONS FROM WASTE WATER

(75) Inventors: Pavel Koren, Kiriat Motzkin (IL); Igal Raz, Kiriat Motzkin (IL); Robert Asimov, Jerusalem (IL); Rami Noach, Omer (IL); Irena Trounkovsky, Nazeret-Illit (IL)

(73) Assignee: Veracon Metal Ltd., Zemach Regional Enterprise (IL)

( * ) Notice: Subject to any disclaimer, the term of this patent is extended or adjusted under 35 U.S.C. 154(b) by 248 days.

(21) Appl. No.: 10/519,428

(22) PCT Filed: Jun. 11, 2003

(86) PCT No.: PCT/IL03/00489

§ 371 (c)(1),
(2), (4) Date: Dec. 22, 2004

(87) PCT Pub. No.: WO2004/002901

PCT Pub. Date: Jan. 8, 2004

(65) Prior Publication Data

US 2006/0054565 A1    Mar. 16, 2006

(30) Foreign Application Priority Data

Jun. 27, 2002 (IL) .................. 150446

(51) Int. Cl.
  *C02F 1/62* (2006.01)
  *C02F 101/20* (2006.01)
(52) U.S. Cl. .............. 210/695; 210/714; 210/724; 210/727; 210/912; 210/913; 423/594.1; 423/633
(58) Field of Classification Search .......... 210/713
  See application file for complete search history.

(56) References Cited

U.S. PATENT DOCUMENTS

| | | | | |
|---|---|---|---|---|
| 4,169,053 A * | 9/1979 | Sakakibara et al. | .......... | 210/724 |
| 4,940,550 A * | 7/1990 | Watson | .......... | 210/695 |
| 5,441,648 A * | 8/1995 | Lidzey | .......... | 210/695 |
| 5,685,993 A * | 11/1997 | Liu | .......... | 210/695 |
| 6,110,379 A * | 8/2000 | Overton et al. | .......... | 210/695 |
| 6,238,571 B1 * | 5/2001 | Olmez et al. | .......... | 210/722 |
| 6,596,182 B1 * | 7/2003 | Prenger et al. | .......... | 210/798 |
| 6,666,972 B2 * | 12/2003 | Lee | .......... | 210/695 |
| 6,896,815 B2 * | 5/2005 | Cort | .......... | 210/695 |

FOREIGN PATENT DOCUMENTS

JP            358011096 A *    1/1983

* cited by examiner

*Primary Examiner*—Peter A. Hruskoci
(74) *Attorney, Agent, or Firm*—Lilling & Lilling, PLLC

(57) ABSTRACT

Method for removal of heavy metal ions from aqueous wastes, which are produced during electroplating and other industrial processes. The method comprises a precipitation process that is conducted in a magnetic field.

11 Claims, 2 Drawing Sheets

METHOD FOR THE REMOVAL OF CONTAMINANT METAL IONS FROM WASTE WATER

BACKGROUND OF THE INVENTION

1. Field of the Invention

The present invention relates to removal of heavy metal ions from aqueous wastes, which are produced during electroplating and other industrial processes such as metal finishing, chemical processing, etc. In particular, the invention refers to the removal from wastewaters of the metal ions $Cr^{+3}$, $Ni^{+2}$, $Cd^{+2}$, $Cu^{+2}$, $Zn^{+2}$ and other cations capable of forming insoluble ferrites with iron ions.

2. Description of the Related Art

There are a variety of proposed technologies and currently employed industrial processes for the purification of aqueous wastes containing metallic ions A short survey of available processes can be found, for example, in U.S. Pat. No. 5,013,453. Among those methods are dilution, evaporation, alkali-precipitation, absorption, dialysis, electro dialysis, reverse osmosis and ion exchange.

The most commonly used industrial method is alkali-precipitation The method is based on addition of a sufficient amount of base to the waste solution in order to precipitate heavy metals in the form of insoluble metal hydroxides. One disadvantage of this method is associated with the difficulty in choosing a suitable pH for precipitation that is satisfactory for solutions containing variable amounts of different heavy metals. A second problem has to do with the amorphous nature of the hydroxides, which renders their separation from the waste solution difficult, and limits the achievable purification.

The so-called ferrite precipitation process is also described in the literature. This process is based on the addition of iron ions to the wastewater and subsequent adjusting of its pH by the addition of a base. The suspension of hydroxides is then oxidized to form spinel ferrite crystals, which settle from the solution. In this process, heavy metal ions are removed from wastewater because they are incorporated into the crystal structure of the spinel ferrite crystals. The advantages of the ferrite precipitation process are associated with the possibility for simultaneous treatment of various kinds of heavy metal ions, with the environmental stability of the precipitated crystals, with the possibility of relatively simple magnetic separation of the crystals, and with the possibility for reuse of the spinel ferrite as a by-product.

A method of extracting heavy metals from industrial wastewaters by the ferrite precipitation method is disclosed in U.S. Pat. No. 3,931,007. In this method, ferrous ions and a base are added to the wastewater to form a suspension of metal hydroxides. Then an oxidizing gas is bubbled through the suspension to form ferrite crystals, which contain both iron and other heavy metal ions. The precipitated crystals are removed, for example, by magnetic separation to provide wastewater with a very low residual heavy metal concentration. The disadvantage of this method lies in the necessity to bubble the oxidizing gas through the solution. This process requires rather prolonged times (3-10 hours) and therefore renders the whole process costly.

An additional purification method, which employs the formation of ferrites for binding contaminant metals, is described in U.S. Pat. No. 6,238,571. In this method a spent mechanical polishing solution, containing abrasive particles and copper ions is treated by adding ferric and ferrous ions to the solution, then adjusting the pH of the solution by addition of a base such as $NH_4OH$ to promote formation of a ferrite precipitate, which can be magnetically separated from the solution. The disadvantage of this method lies in the fact that it requires adjusting the pH to a high value about 11, which is associated with the consumption of a large amount of a base such as potassium hydroxide, ammonium hydroxide or sodium hydroxide.

Furthermore, the described method refers merely to removal of copper and does specify how it should be carried out for the removal of other contaminant ions, for example chrome, which is present in the form of $CrO_4^{-2}$.

In U.S. Pat. No. 5,685,993 an apparatus and method for ferrite formation and removal of heavy metals ions by ferrite co-precipitation from aqueous solutions is described. In accordance with this method, ferromagnetic ferrite crystals can be continuously formed from aqueous waste solution by adding ferrous sulfate to form a solution with a particular molar ratio of iron to heavy metal, agitating the solution, adding a base to the solution to adjust its pH to a value more than 10, distributing air through the solution, forming a ferrite slurry and then settling the slurry. Besides the same disadvantages, which were mentioned in connection with U.S. Pat. No. 3,931,007, this method requires a relatively high value of pH and, relatively long bubbling and retention times which render the process costly. In conclusion it may be stated, that each of the above-listed ferrite precipitation methods has its specific advantages and disadvantages and none of them, unfortunately, provides a satisfactory solution for the treatment of waste solutions containing heavy metals Thus, despite the fact that numerous processes have been devised for purifying contaminated wastewaters from cations of contaminant heavy metals, there still is a need for a new and improved method, which is simple, inexpensive, convenient, efficient, and reliable. The present invention suggests a new method for the removal of metals from wastewater, which is also based on the formation of ferrites of the metals with their subsequent co-precipitation and separation in the form of an insoluble solid. Because of the unique features of the present invention, the process is simplified and retention times are minimized making the process commercially feasible.

3. Object of the Invention

The object of the present invention is to provide a new and improved method for removal of contaminant heavy metals from wastewater, which overcomes drawbacks of the present methods. In particular the main object of the present invention is to provide a new and improved method, which allows the rapid and efficient treatment of wastewaters containing contaminant heavy metals by co-precipitation of their ferrites. The further object of the present invention is to provide new and better method, which does not require bubbling of a gas oxidizer and which can be carried out in a fast and simple way at ambient temperature. The third object of the present invention is to provide a new and efficient method for the treatment of wastewater, which results in a residual concentration of contaminant metal ions in the wastewater in the range of 0.01-0.04 ppm.

Yet another object of the invention is to provide a new and versatile method for treatment of wastewater, which results in formation of a compact crystalline sediment, which can be easily dried and converted into a dry powder with a high concentration of ferrite suitable for reuse as a ferromagnetic by-product.

The above and other objects and advantages of the present invention can be achieved in accordance with the present method for the removal of contaminant metals ions from aqueous solution by ferrite co-precipitation that occurs in a magnetic field.

In accordance with one of the preferred embodiments the present method comprises:
  i) providing a source of iron ions, said source containing at least $Fe^{+2}$ ions
  ii) providing a source of $OH^-$ ions
  iii) adding said $Fe^{+2}$ ions to the aqueous solution
  iv) adding said $OH^-$ ions to the said aqueous solution in the presence of a magnetic field.
  v) precipitation of said ferrites from the aqueous solution.

The present invention has only been summarized briefly. For a better understanding of additional embodiments of the invention as well of its advantages, reference will now be made to the following description with reference to the accompanying drawings.

DETAILED DESCRIPTION OF THE INVENTION

Figure 1:
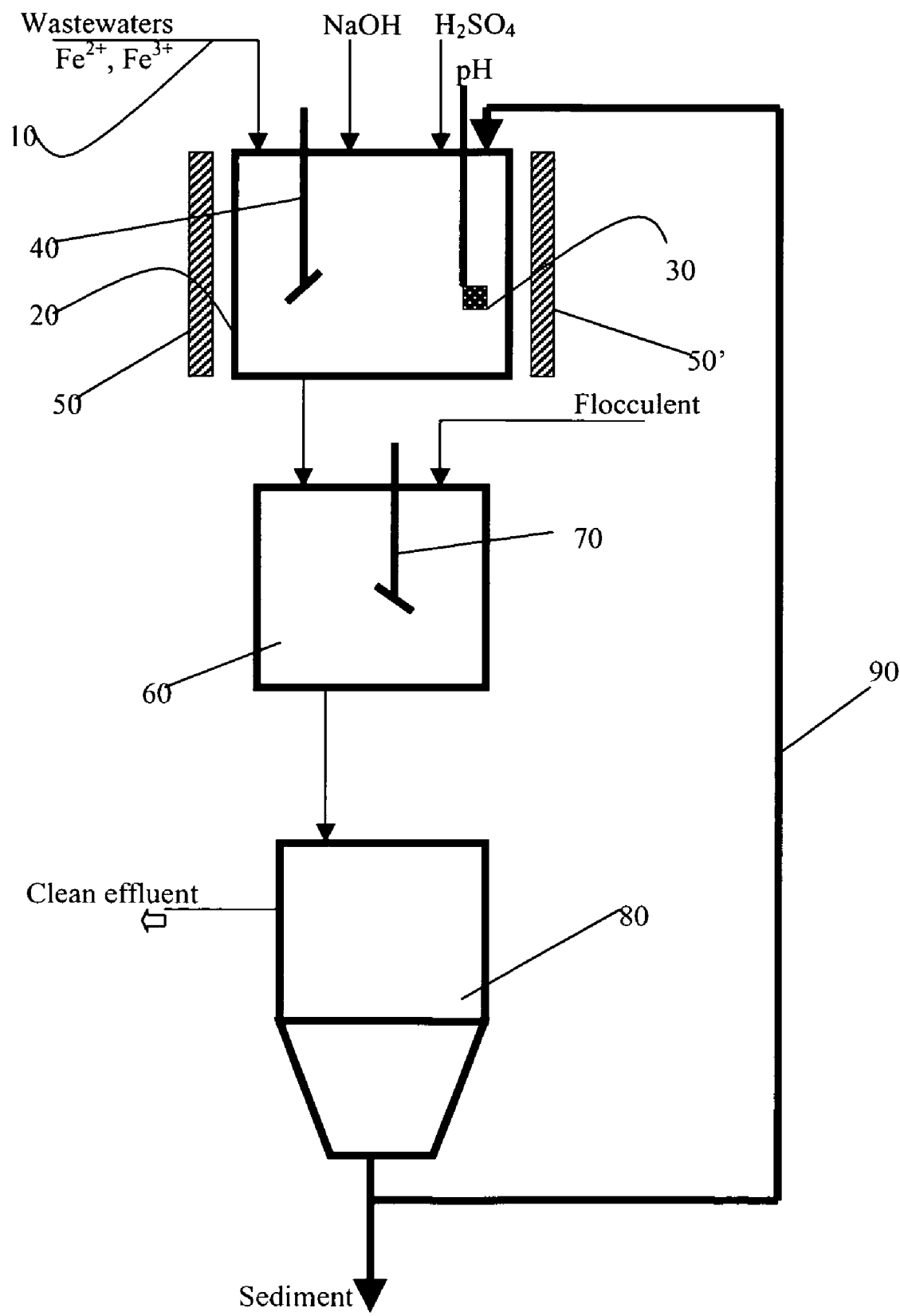
FIG. 1 is a schematic flow diagram of the purification method in accordance with one embodiment of the invention.

The present invention is directed to the purification of wastewaters originating mainly from electroplating processing and usually containing cations such as $Cr^{+6}$, $Zn^{+2}$, $Ni^{+2}$, and $Cd^{+2}$. The principle for removal of the contaminant elements employed in the present invention is based on the ferrite co-precipitation process, which is known per se and which employs the addition of iron ions to the wastewaters to precipitate insoluble ferrites containing the contaminant elements. The ferrite co-precipitation process can be described by the following general equation:

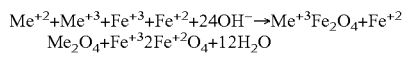
$Me^{+2}+Me^{+3}+Fe^{+3}+Fe^{+2}+24OH^- \rightarrow Me^{+3}Fe_2O_4+Fe^{+2}Me_2O_4+Fe^{+3}2Fe^{+2}O_4+12H_2O$ The presence of magnetite ($FeO.Fe_2O_3 = FeFe_2O_4 = Fe_3O_4$) in the aqueous solution promotes formation of crystalline ferrites containing the contaminant metals.

In order to purify wastewaters containing hexavalent chrome along with other bivalent and trivalent metals, it is necessary to first reduce the $Cr^{+6}$ to $Cr^{+3}$. This is accomplished by adding to the wastewater $Fe^{+2}$ ions and $H^+$ ions. In an acid solution, the ferrous ions reduce hexavalent chrome to trivalent chrome, while $Fe^{+3}$ ions, which are necessary for formation of ferrites and magnetite, are produced by oxidation of the ferrous ion during reduction of chrome to the trivalent state. In practice, if the treated wastewaters contain hexavalent chrome ions, then reduction of chrome is carried out separately as a first step.

After completing the chrome reduction step, ferrous ions along with a base are supplied to the wastewaters being treated in order to carry out the further steps, necessary for precipitation of ferrites.

In accordance with the present invention, it has been unexpectedly discovered, that if an aqueous solution, containing heavy metals and iron ions is placed in a magnetic field and subsequently a base is added to the solution, the formation of ferrites and their precipitation occurs faster, and said ferrites form to the almost complete exclusion of other precipitates. The ferrites precipitate more readily and their separation from the effluent is much faster and easier than that of other possible precipitates. Furthermore, it has been found that by employing a magnetic field, it is possible to obtain ferrites more efficiently than in the previously described ferrite co-precipitation process, rendering the entire process less complicated and more economical. It has been found also, that by virtue of magnetic treatment, it is possible to reduce the residual concentration of most contaminant metals in the clean effluent to levels, which are significantly less than current government requirements.

In practice, the first step (reduction of chrome) is carried out, by adding, for example, an aqueous solution of $FeSO_4$ and sufficient $H_2SO_4$ to the wastewater in order to adjust the solution pH to 2.30-2.5. The exact amount of $FeSO_4$ depends on the concentration of hexavalent chrome and the concentration of other bivalent or trivalent ions in the wastewater.

In the next step, depending on the composition of the wastewater solution, ferrous and ferric ions are added to the solution. In accordance with the invention, suitable iron salts are, for example, $FeSO_4$ and $Fe_2(SO_4)_3$. The ratio between the ferric and ferrous ions in the aqueous solution should be about 1 gram-ion of ferrous ion to 2 gram-ion of ferric ion.

In the next step, a base (e.g. NaOH) is added to the solution in the same or a different reaction vessel. The base is added while the solution is in a magnetic field. The amount of the base should be sufficient to maintain the pH of the wastewater at 9-9.5 during the reaction process.

It is advantageous if ferrite seed crystals are added to the solution along with the other reagents in order to induce formation of spinel-like ferrites and their growth on the seed crystals. Natural or synthetic magnetite is very suitable for this purpose.

In practice it is advantageous to use a magnetic field of at least 300 Gauss. The solution remains in the field while the ferrites are forming for about 10-15 minutes. The solution should be agitated, e.g. by a mechanical mixer during this time.

It has been discovered, that the magnetic treatment can also be used during preparation of the magnetite seed, since the magnetic field promotes magnetite formation.

The clean effluent together with the sediment proceeds to the settling stage, where, after settling, the sediment is filtered and/or magnetically separated. Herein, sediment is meant to be a product of the separation of a solid material from a liquid by allowing the solid to settle out of the mixture by gravitational and/or magnetic forces.

With reference to FIG. 1, an aqueous solution 10 containing contaminant metals is supplied to a reaction vessel 20 along with the other reactants, necessary for formation of crystalline ferrites. Among those reactants are iron salts, NaOH and $H_2SO_4$ (if required for reducing hexavalent chrome). The reaction vessel is provided with a means 30 for measuring the pH value. It is not shown specifically, but it should be understood, that additional instrumentation, used in practice for controlling various process parameters would normally be employed. Within the reaction vessel a mixing means 40, e.g. mechanical stirrer is provided and outside the vessel two permanent magnets 50, 50' are located, which produce the required magnetic field throughout the vessel.

After completing the reduction of chrome and the formation of ferrites, the solution is transferred to a separate vessel 60, which is in flow communication with the first vessel. In this separate vessel, precipitation of the ferrites is completed. To assist the precipitation process, this vessel is provided with an inlet for supplying a flocculent (if desired) and with a mixer 70. The sediment, consisting of precipitated ferrites is transferred into a settling vessel 80, in which it settles. After settling, the sediment is separated from the clean effluent and proceeds to water removal (if necessary). The clean effluent proceeds to the treated water storage (not shown).

By virtue of the purification process contained in the present invention, the residual concentration of contaminant metal ions in the clean effluent can be brought to extremely low values. In particular, the atomic absorption measurements showed, that clean effluent contains less than 0.04 ppm of chrome, less than 0.04 ppm of nickel and less than 0.01 ppm of zinc.

The sediment consists of metal ferrites and magnetite. The crystalline and magnetic properties of the precipitate render its separation and subsequent water removal more efficient than is the case with hydroxide sediments. After water removal, a valuable by-product powder, with a high concentration of ferromagnetic ferrites is obtained.

In practice, it is advantageous in terms of completeness of the purification process, to recycle a fraction of the sediment from the settling vessel to the reaction vessel through a dedicated conduit 90. The sediment is transferred to the reaction vessel, where it is mixed with NaOH and with a fresh portion of wastewater (previously treated to reduce any hexavalent chrome). The reaction mixture is exposed to a magnetic field as described above. The previously precipitated ferrites introduced with the recirculated sediment promote further formation of ferrites with a well-defined crystalline structure, which readily precipitate and settle. In order to remove ions of contaminant metals more completely the recirculation step can be repeated several times.

The above-described process can be operated in either a batch or a continuous mode.

Now some non-limiting examples of the present invention will be described in more detail. In the batch process examples, to simplify the laboratory procedure, only one vessel was used as opposed to the three shown in FIG. 1. The vessel was simply removed from the magnetic field during thoses steps where no field was present. Technical quality reagents are employed in the following examples.

EXAMPLES OF FERRITE PRECIPITATION USING A BATCH PROCESS OF THE INVENTION

Example 1

Purification of Wastewaters with a Relatively High Concentration of Hexavalent Chrome Step 1. Preparation of Synthetic Magnetite Seed 13.9 grams of $FeSO_4.7H_2O$ and 20.9 grams of $Fe_2(SO_4)_3.H_2O$ were dissolved in 0.5 liter of water and placed in a magnetic field. A 12.5% solution of NaOH was gradually added to the solution of salts while the solution was being mixed. The pH of the solution was maintained at 9.5 and the process continued for about 15 minutes. A total of 68 cc of NaOH solution was used. It was possible to expedite the reaction by adding up to 3 grams of magnetite to the reaction mixture. The reaction resulted in precipitation of black magnetite crystals. To increase the settling rate of the magnetite, a permanent magnet was placed under the reaction vessel and its contents were exposed to the magnetic field for about 5 minutes. The volume of the obtained crystalline sediment was about 70 $cm^3$.

Step 2. Preparation of a Synthetic Wastewater Solution

A solution containing 500 ppm hexavalent chrome ions, 50 ppm zinc ions and 30 ppm nickel ions was prepared.

Step 3. Reducing Hexavalent Chrome 32.5 cc of a $FeSO_4$ solution containing 40 grams $Fe^{+2}$ per liter were added to 0.5 liter of the wastewater prepared in step 2. The components were mixed and the pH was adjusted to 2.3-2.5 by adding $H_2SO_4$. 3.6-4.2 $cm^3$ of a 24% solution of $H_2SO_4$ was used. The solution was checked to ensure that no hexavalent chrome was present.

Step 4. Formation of Ferrites Containing the Contaminant Metals

Most of the solution obtained during preparation of magnetite was carefully drained by decantation from the reaction vessel. The vessel was placed between two permanent magnets, disposed in such a manner that they created an approximately uniform field within the vessel. The synthetic wastewater solution from step 3 was added together with a 12.5% solution of NaOH to the reaction vessel, while a mixer agitated the reagents. The pH was maintained at 9-9.5. A total of 15.8-17 $cm^3$ of NaOH solution was added. The precipitation step lasted about 15 minutes.

Step 5. Settling

After ferrite formation, the precipitate was allowed to settle for various lengths of time. Settling was carried out in the absence of a magnetic field. The initial volume of the sediment was 645 $cm^3$. After one hour the sediment volume was 243 $cm^3$ and on the next day it was 205 $cm^3$.

The residual concentration of contaminant metal ions in the treated wastewater was measured by atomic absorption. The solution contained less than 0.04 ppm of chrome, less than 0.04 ppm of zinc and less than 0.01 ppm of nickel Step 6. Recycling the Ferrites The purified solution obtained in step 5 was drained from the vessel by decantation leaving the ferrite and magnetite sediment and steps 4 and 5 were repeated using a new portion of wastewater (prepared as described in steps 2 and 3).

By virtue of the continued reuse of the previously obtained sediment, the sediment volume increased from 243 $cm^3$ (after the first cycle) to 390 $cm^3$ (after the $7^{th}$ cycle). Assuming that all solids are present as oxides, the calculated percentage of solid in the suspended sediment is 5.6% after the first cycle. After the last batch was processed, the sediment was separable from the solution by simple filtration without the application of additional measures, like vacuum filtration etc. The weight of wet sediment (after filtration) before drying was 269 grams and after drying 44.3 gram, i.e. the solid phase content was 16.4%. The dry precipitate contained 50.4% iron, 5.7% chrome, 0.33% nickel and 0.48%, wherein the weight ratio between the total amount of iron ions and the amount of heavy metal ions in the precipitated solid ferrites is 7.74 zinc.

Example 2

Purification of Wastewaters with a Relatively High Concentration of Hexavalent Chrome (with Magnetically Assisted Settling)

The same procedure has been repeated, but in contrast to the previous example, a permanent magnet was placed under the bottom of the reaction vessel during settling (step 5). This measure significantly accelerated the settling rate and improved the compactness of the suspended sediment. The magnetic field gradient (and thus its influence) diminishes with increasing precipitate thickness. The calculated solid phase content in the precipitate was 8.8% after the first cycle and 7.1% after the $10^{th}$ settling.

Example 3

Purification of Wastewaters with a Relatively Low Concentration of Hexavalent Chrome Step 1. Solution Preparation A solution containing 60 ppm of hexavalent chrome ions, 40 ppm of zinc ions and 20 ppm of nickel ions was prepared as a synthetic wastewater solution.

Step 2. Reducing Hexavalent Chrome to Trivalent Chrome

Reduction of the chrome in this solution was accomplished by the addition of $FeSO_4$ and $H_2SO_4$. While mixing, 4.1 cc of $FeSO_4$ solution (40 grams per liter concentration of $Fe^{+2}$) and then a sufficient amount (0.6-0.7 cc) of a 24% solution of $H_2SO_4$ was added to 0.5 liter of the solution prepared in step 1 to obtain a final pH of 2.3-2.5. The solution was checked to ensure that no hexavalent chrome remained in solution.

Step 3. Preparation of Magnetite Seed

This step was carried out as described in step 1 of Example 1.

Step 4. Formation of Ferrites of Contaminant Metals

Most of the solution obtained during preparation of magnetite was carefully drained by decanting from the reaction vessel. The vessel was placed between two permanent magnets. The wastewater solution from step 2 along with a 12.5% solution of NaOH was gradually added to the reaction vessel maintaining the solution pH at 8-9.5. A mixer agitated the solution and the reaction allowed to continue for 15 minutes maintaining the pH at 8-9.5. The total amount of NaOH used was 3.5-4.0 $cm^3$.

Step 5. Settling of the Ferrite Precipitate

This was carried out using the permanent magnet as described in example 2. The residual concentration of the contaminant metals in the treated wastewater was measured by atomic absorption. The clean solution contained less than 0.04 ppm of chrome, less than 0.04 ppm of zinc and less than 0.01 ppm of nickel.

Step 6. Recycling of the Sediment

The treated wastewater (from step 5) was drained from the vessel by decantation and then steps 4 and 5 were repeated. The sediment volume after the first cycle was 150 $cm^3$ and its volume changed during treatment of subsequent batches of wastewater as shown in Table 1. Note that the weight of iron in the magnetite seed (10 gram) is very large compared to the total cation weight in each batch of wastewater (0.2 gram) so that even after 20 cycles, it is expected that the volume should increase by only 40% if the precipitate remains in the form of ferrites.

TABLE 1

Required settling time as a function of number of repetitions of steps 4 and 5

| Number of cycles | 1 | 7 | 10 | 13 | 20 |
|---|---|---|---|---|---|
| Precipitation time, minutes | 5 | 10 | 15 | 25 | 50 |
| Sediment volume, $cm^3$ | 150 | 150 | 150 | 160 | 270 |

The calculated amount of dry solid in the sediment after the first cycle was 11.7%, 10.8% after the $13^{th}$ cycle and 9.1% after the $22^{nd}$ cycle.

The method described in Example 3 was used for purification of wastewater from a commercial chemical process in which natural phosphate rocks were treated by hydrochloric acid for producing of phosphoric acid.

Concentration of various ions before and after purification is summarized in Table 2.

TABLE 2

Residual Metal Ion concentrations (ppm)

| Ion | Concentration before purification | Concentration after purification |
|---|---|---|
| Ag | <0.2 | 0.03 |
| Cd | <0.1 | <0.01 |
| Co | <0.1 | <0.01 |
| Cr | <0.1 | <0.01 |
| Cu | 2.4 | 0.02 |
| Mo | <0.1 | 0.01 |
| Ni | 0.1 | <0.01 |
| Pb | 1.0 | <0.05 |
| Sb | <0.5 | <0.02 |
| Se | <0.5 | <0.02 |
| Sn | <0.5 | <0.02 |
| Ti | 6.4 | <0.02 |
| V | 1.4 | <0.02 |
| Zn | 2.2 | 0.02 |

It can be seen that by virtue of the present invention, the residual concentration of contaminant ions in the wastewater was reduced by at least an order of magnitude Hydroxide Precipitation Now with reference to examples 4 and 5 below, results will be shown for the purification achievable by the conventional method employing precipitation of hydroxides.

Example 4

Treatment of Wastewaters with a Relatively High Concentration of Hexavalent Chrome by Hydroxide Precipitation Step 1. Solution Preparation 0.5 liter of a synthetic wastewater solution, containing 500 ppm of $Cr^{+6}$, 50 ppm of $Zn^{+2}$ and 1 ppm of $Ni^{+2}$ was prepared Step 2. Reducing Hexavalent Chrome.

The wastewater solution was mixed with sodium 1.13 g of sodium meta bi-sulfate and sufficient acid (2.2 $cm^3$ of 24% $H_2SO_4$) to adjust the pH to 2.3, thus reducing the $Cr^{+6}$ to $Cr^{+6}$ Step 3. Hydroxide Precipitation 4.6 $cm^3$ of 12.5% NaOH was added to the solution to precipitate hydroxides of the contaminant metals.

After one hour, the volume of the sediment was 200 $cm^3$. The calculated amount of hydroxides in the sediment was 0.26%.

Example 5

Purification of Wastewaters with a Relatively Low Concentration of Hexavalent Chrome Step 1. Preparation of a Synthetic Wastewater Solution 0.5 liter of a synthetic wastewater solution, containing 60 ppm of $Cr^{+6}$, 40 ppm of $Zn^{+2}$ and 20 ppm of $Ni^{+2}$ was prepared Step 2. Reduction of Hexavalent Chrome to Trivalent Chrome The wastewater solution was mixed with 0.12 g of sodium meta bi-sulfate and with sufficient acid (0.6 $cm^3$ of 24% $H_2SO_4$) to adjust the pH to 2.3 and to reduce all $Cr^{+6}$ in the solution.

Step 3. Precipitation

After reduction, 1.9 $cm^3$ of 12.5% NaOH was added and after one hour the volume of the sediment reached 40 $cm^3$. The calculated dry weight of hydroxides in the sediment was 0.26% compared to a calculated dry weight of contaminated metal oxides of 1.4% after 20 cycles in example 3.

From the above examples follows that the conventional method of purification is less efficient since the achievable amount of solid phase in the sediment is significantly less than in the present invention.

Semi-Continuous Flow Ferrite Precipitation in Accordance with the Present Invention The above-described examples 1-3 referred to the ferrite precipitation process, carried out in a batch mode. Now with reference to schematic flow chart shown in FIG. 2 and example 6, a semi-continuous flow process will be described. The process is not continuous as the magnetite seed is introduced initially and the amount is not continuously renewed. The method, which will be described, further refers to the purification of wastewater, in which hexavalent chrome has already been reduced.

Figure 2:
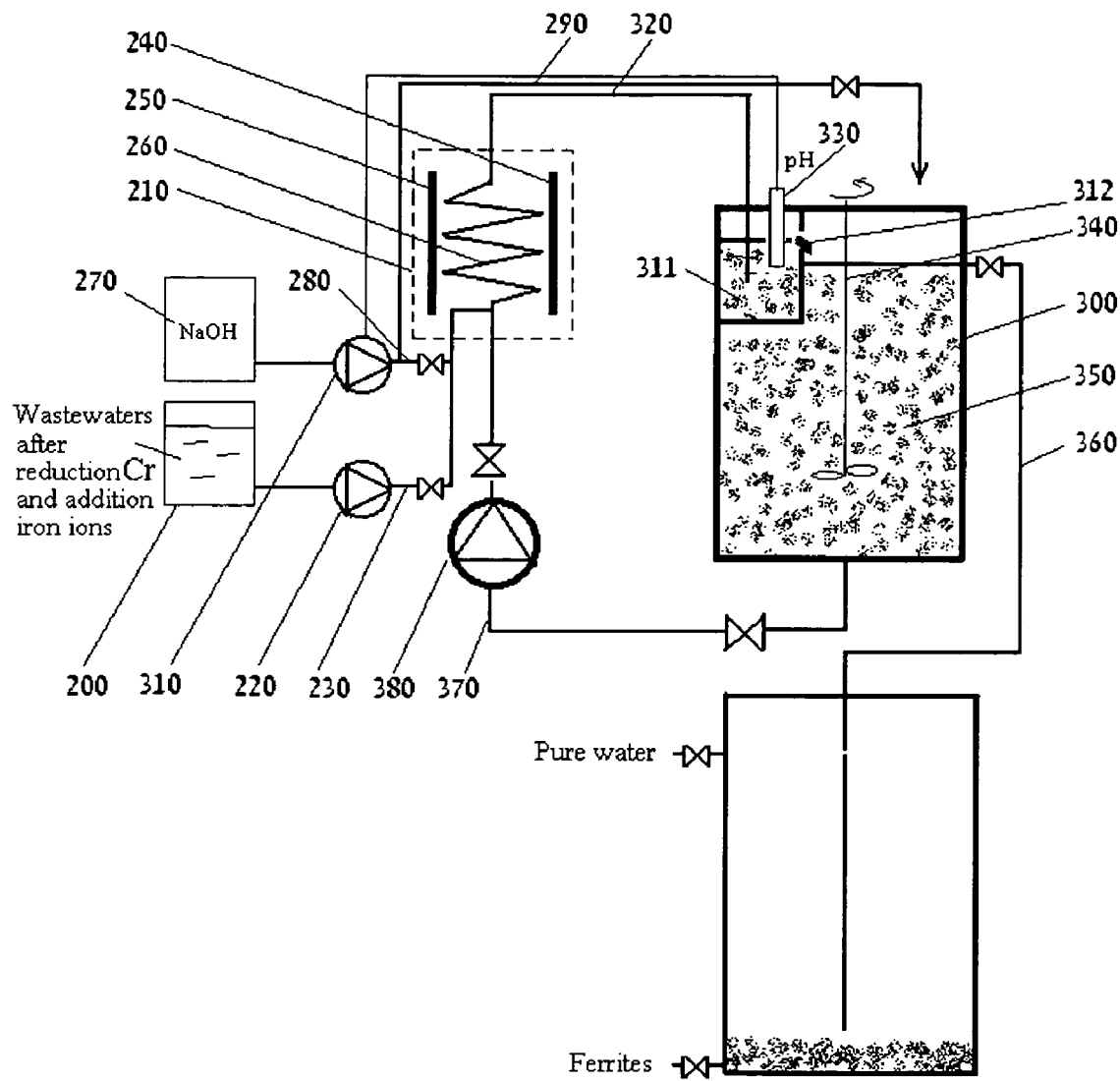
FIG. 2 is a schematic flow diagram of the purification method in accordance with another embodiment of the invention.

In FIG. 2 it is seen that wastewater is supplied from a tank 200 to a system 210 in which the ferrite precipitation reaction is carried out in a magnetic field. Tank 200 is connected to the system 210 through a connection line provided with a feeding pump means 220 and a valve 230. Flat neodymium iron boron magnets (not shown) with a magnetization vector normal to the plane are located at the two opposite vertical planes 240, 250. The distance between the planes can be varied so as to adjust the distance between the magnets. Four flat magnets, having dimensions 63×83 mm are located on each plane. The magnetic field strength close to the magnets is about 1400 Gauss and it gradually diminishes towards the middle plane between the magnets. In practice if the distance between the magnets is 20 cm, the magnetic field strength diminishes to about 750 Gauss A multi-turn coil made of 45 meters of silicone tubing (6 mm inside diameter by 9 mm outside diameter) is placed in the air gap between the magnets oriented so that its axis is perpendicular to the field direction. A feed pump supplies wastewater to the coil at a flow rate of about 1 liter per hour.

A source 270 of NaOH is provided, which is in flow communication with the coil 260 via a dedicated line 280. The source 270 is also in flow communication with a recirculation vessel 300 via a dedicated line 290. NaOH is supplied from the source 270 to the coil and to the recycle vessel by virtue of a pump 310. The upper part of the recycle vessel is provided with a chamber 311, in which the pH of the reaction mixture is measured. It is not shown specifically, but should be understood, that other reactants, like iron salts, which might be necessary for the precipitation process can be also supplied to the recirculation vessel.

The chamber 311 is in flow communication with the coil via line 320. An opening 312 is provided in the chamber wall, through which the reaction mixture can pass to the recirculation vessel. The chamber is equipped with a pH measuring instrument 330. The recycle vessel is provided with a mixing means 340 for agitating the reaction mixture. Metal ferrites form in the coil as a suspension 350, which can be evacuated via an overflow from the re-circulation vessel for further settling via an outlet line 360. A portion of the suspension is recycled at a flow rate 40-60 liter per hour from the recycle vessel back to the coil via a recycle line 370, provided with a recycle pump 380. Optionally one can also recycle part of the solid separated in the settling vessel if needed. As the wastewater and the suspension are pumped through the coil they move in a turbulent fashion being at the same time exposed to the magnetic field. By virtue of this provision, the reaction mixture is vigorously agitated, promoting the precipitation process.

It should be understood, however, that the invention is not limited to the above-described configuration, including tubular coils situated between flat opposite magnets. The system can be provided with a couple of outside magnets and with an agitator as explained previously with reference to FIG. 1.

Example 6

Semi-Continuous Flow Treatment of Wastewater by the Ferrite Precipitation Method Step 1. Preparation of Synthetic Magnetite Seed 139 gram of $FeSO_4.7H_2O$ and 209 gram of $Fe_2(SO_4)_3.H_2O$ were dissolved in 4 liter of water and this solution was supplied to the coil simultaneously with 1.5 liter of 5.2% solution of NaOH so as to maintain the solution pH at 9.5.

Preparation of seed lasted more than one hour. The entrance of the reaction mixture to the coil was proximate to the magnets. The circulation of the reaction mixture was kept at 45 liter/h and the pressure drop through the system was 7.5-meter water. After completing this step, most of the water was drained by decantation from the re-circulation vessel.

Step 2. Preparation of the Synthetic Wastewater Solution

The wastewater solution has a pH of 2-2.5 and contains 140 ppm Cr trivalent as chromium sulfate, 50 ppm Zn bivalent as zinc sulfate and 20 ppm Ni bivalent as nickel sulfate, as well as 75 ppm bivalent Fe and 123 ppm trivalent Fe.

Step 3. Treatment

The purification step was conducted according to flow-chart shown in FIG. 2. The metering pump 220 was adjusted to supply to the system 1 liter/hour wastewater solution 200 (prepared in step 2), via line 230. The circulation was operated as in step 1. 12.5% NaOH solution (designated as 270) was added to the recycle vessel 300 at a rate of 3.5-5.0 cc per 1 liter wastewater solution via pH controlling pump 310 and line 290. The pH was kept at 9.5. Overflow from the recycle vessel passed via conduit 360 to a separation vessel where ferrite settled and clear purified wastewater accumulated. During operation for several days (with periodic interruptions) 20 liters of wastewater was processed. The following results were obtained:

| Quality of purified solution | |
|---|---|
| Fe | 0.4 ppm |
| Cr | less than 0.05 ppm |
| Zn | less than 0.04 ppm |
| Ni | less than 0.04 ppm |

Example 7

Treatment of a Real Wastewater Solution

A wastewater solution taken from an electroplating plant with the following composition was used:

| Total Cr | 16.9 ppm |
|---|---|
| $Cr^{+6}$ | 13.6 ppm |
| $Ni^{+2}$ | 1.2 ppm |
| $Zn^{+2}$ | 1.4 ppm |

Step 1. Reduction of Hexavalent Cr

Reduction of $Cr^{+6}$ was carried out by addition of bivalent Fe. The calculated concentration of the iron before reduction was 74 ppm.

Step 2. Ferrite Precipitation

The process was carried out as described in example 6. During several days, more than 17 liters were purified.

The residual concentration in the treated wastewater was as follows:

Iron 0.4 ppm
Cr less than 0.05 ppm
$Zn^{2+}$ less than 0.04 ppm
$Ni^{2+}$ less than 0.04 ppm.

Example 8

Utilization of Iron Rich Wastewater

In a further experiment, the purification process of Example 7 was repeated with the exception that the $Fe^{+2}$ source for the reduction operation was supplied from an effluent of a plant where steel pressure vessels were prepared. The effluent had the following analysis:

$Fe^{+2}$ 180 ppm
$Fe^{+3}$ 26 ppm

Feeding ratio was: 1 liter of electroplating effluent per 443 cc of iron effluent solution. 16 liters of mixed wastewater solutions were processed. The same quality of treated wastewater were obtained.

Results achieved after treatment of wastewaters by the present invention and by the conventional method of metal hydroxides precipitation are compared in Table 3. The table shows the residual concentration of Cr, $Zn^{+2}$ and $Ni^{+2}$ as well the concentration levels required by the current government regulations.

TABLE 3

| | Concentration in ppm after settling | | |
|---|---|---|---|
| Purification method | $Cr^{+6}$ | $Zn^{+2}$ | $Ni^{+2}$ |
| Precipitation of hydroxides at pH 9.5 without flocculent | 0.12 | 0.21 | 0.35 |

TABLE 3-continued

| | Concentration in ppm after settling | | |
|---|---|---|---|
| Purification method | $Cr^{+6}$ | $Zn^{+2}$ | $Ni^{+2}$ |
| Precipitation of hydroxides at pH 9.5 with flocculent | 0.16 | 0.18 | 0.19 |
| Required concentration according to government regulations | 0.25 | 5.0 | 1.0 |
| Present invention | Less than 0.04 | Less than 0.04 | Less than 0.04 |

It can easily be appreciated that the purification method of this invention results in a residual concentration of contaminant ions, which is an order of magnitude lower than allowed by the government regulations and several times less than in the currently most used process.

It should be appreciated that the present invention is not limited by the above-described embodiments and that one ordinarily skilled in the art can make changes and modifications without deviation from the scope of the invention as will be defined below in the appended claims.

In the following claims the term comprising means "including but not limited to", the term precipitation means the conversion of a dissolved substance into insoluble form by chemical and/or magnetic means, the term agitation means keeping a solution in motion by mixing or movement e.g. by flow or due to mixers, impellers or other means.

It should also be appreciated that features disclosed in the foregoing description, and/or in the foregoing drawings, and/or examples, and/or tables, and/or following claims both separately and in any combination thereof, are material for realizing the present invention in diverse forms thereof.

The invention claimed is:

1. A method for removal of ions of heavy metals from an aqueous solution to reduce residual heavy metal ion concentration, said method comprising: formation of insoluble ferrites of said heavy metals, precipitation of said insoluble ferrites from the aqueous solution and separation of said insoluble ferrites from the aqueous solution, wherein at least formation of said insoluble ferrites is carried out in the presence of a magnetic field with a magnetic strength of at least 300 Gauss, and sufficient base and ferrous ions to form said ferrites, the precipitation of said insoluble ferrites is carried out in the presence of a ferrite seed crystals, and formation of said insoluble ferrites comprises formation of ferrites of said heavy metals to almost complete exclusion of other precipitates, wherein the base is added while the solution is in said magnetic field.

2. A method as claimed in claim 1 wherein formation of said insoluble ferrites comprises:
 a. providing a source of $OH^-$ ions
 b. adding said source of $OH^-$ ions to the aqueous solution.

3. A method as claimed in claim 2, further comprising adjusting the pH value of said aqueous solution to an appropriate value to initiate formation of ferrites of said heavy metals.

4. A method as claimed in claim 3, wherein the pH value of the aqueous solution is kept between 8 and 9.5.

5. A method as claimed in claim 2, wherein said source of $OH^-$ ions comprises a base.

6. A method as claimed in claim 5, wherein said base is NaOH.

7. A method as claimed in claim 2, wherein the weight ratio between the total amount of iron ions and the amount of ions of heavy metals in the precipitated solid ferrites 7.74.

8. A method as claimed in claim 1, wherein said seed comprises magnetite.

9. A method as claimed in claim 1, further comprising recirculation of at least a portion of the precipitated insoluble ferrites.

10. A method as claimed in claim 1, wherein separation of precipitated insoluble ferrites from the aqueous solution comprises a filtration procedure.

11. A method as claimed in claim 1, wherein separation of precipitated insoluble ferrites from the aqueous solution comprises a settling procedure.

* * * * *